United States Patent [19]

Logan et al.

[11] Patent Number: 6,077,559
[45] Date of Patent: *Jun. 20, 2000

[54] FLAVORED OIL-IN-VINEGAR MICROEMULSION CONCENTRATES, METHOD FOR PREPARING THE SAME, AND FLAVORED VINEGARS PREPARED FROM THE SAME

[75] Inventors: Steven S. Logan, Felton, Pa.; Michael A. Porzio, Monkton, Md.

[73] Assignee: McCormick & Company, Incorporated, Sparks, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 09/066,256

[22] Filed: Apr. 27, 1998

[51] Int. Cl.[7] .............................. A23L 1/221; A23L 1/222; A23L 2/56
[52] U.S. Cl. .......................... 426/650; 426/533; 426/534; 426/638; 426/651
[58] Field of Search ................................ 426/17, 51, 533, 426/534, 602, 638, 650, 651

[56] References Cited

U.S. PATENT DOCUMENTS

| | | | |
|---|---|---|---|
| 3,615,702 | 10/1971 | Swisher et al. | 99/144 |
| 4,120,990 | 10/1978 | Seiden | 426/601 |
| 4,539,215 | 9/1985 | Schweid et al. | 426/589 |
| 4,701,336 | 10/1987 | Softly et al. | 426/538 |
| 4,701,338 | 10/1987 | Del vento | 426/602 |
| 4,826,702 | 5/1989 | Hayashi et al. | 426/589 |
| 4,835,002 | 5/1989 | Wolf et al. | 426/590 |
| 5,045,337 | 9/1991 | El-Nokaly et al. | 426/602 |
| 5,215,757 | 6/1993 | EL-Nokaly | 424/488 |
| 5,283,056 | 2/1994 | Chung et al. | 424/49 |
| 5,356,641 | 10/1994 | Bowen et al. | 426/52 |
| 5,624,612 | 4/1997 | Sewall et al | 264/4.1 |

FOREIGN PATENT DOCUMENTS

| | | |
|---|---|---|
| 2693471 | 1/1994 | France . |
| 61-254179 | 11/1986 | Japan . |
| 3-058766 | 3/1991 | Japan . |
| 5-153955 | 6/1993 | Japan . |

OTHER PUBLICATIONS

F.A. fazzalari, *Compilation of Odor and Taste Value Data,* ASTM Data Series DS 48A, Philadelphia, p. 63, 1978.
*Microemulsions and Emulsion in Foods,* ACS Symposium Series 448, M. El–Nokaly and D. Cornell, Eds., American Chemical Society, Washington, D.C. pp. 7–43, 1991.
*Microemulsion, Theory and Practice,* L.M. Prince, Ed. Academic Press, Inc., New York, pp. 1–57 and 91–149, 1977.
*ICI Products for Food,* pp. 15–16, 1997.

*Primary Examiner*—Keith D. Hendricks
*Attorney, Agent, or Firm*—Oblon, Spivak, McClelland, Maier & Neustadt, P.C.

[57] ABSTRACT

Stable, clear, flavored vinegars may be prepared by diluting a flavored oil-in-vinegar microemulsion concentrate, which comprises:

(a) 25 to 70% by weight of 50 to 100 grain vinegar;
(b) 5 to 35% by weight of ethanol;
(c) 0.1 to 5% by weight of a flavor material; and
(d) 0.5 to 5% by weight of a surfactant, with vinegar.

20 Claims, No Drawings

FLAVORED OIL-IN-VINEGAR MICROEMULSION CONCENTRATES, METHOD FOR PREPARING THE SAME, AND FLAVORED VINEGARS PREPARED FROM THE SAME

BACKGROUND OF THE INVENTION

1. Field of the Invention

The present invention relates to flavored oil-in-vinegar microemulsion concentrates. The present invention also relates to methods for preparing such flavored oil-in-vinegar microemulsion concentrates. The present invention further relates to flavored vinegars which are prepared from such flavored oil-in-vinegar microemulsion concentrates.

2. Discussion of the Background

Flavored vinegars are desirable for a number of reasons. Today's consumer is becoming increasingly health conscious. Consumption of low fat food products is considered a relevant health option. The market for low fat food products has grown considerably in the past decade. However, it is common knowledge to the food industry that generally when fat is reduced flavor quality and impact are also reduced for a given food product. The use of flavored vinegars is one method of providing flavor quality and impact while improving low fat characteristics.

However, it is difficult to produce flavored vinegars which are clear, stable, and provide noticeable flavor impact. Flavored vinegars currently available in the marketplace are produced by standard methods, i.e.: (1) infusing vinegar with fresh or dry organic flavoring materials; or (2) blending flavor materials with vinegar. Both methods suffer from shortcomings.

The infusion method is time consuming; the process may take as long as from several days, in the case of a fresh herb, to months, in the case of special balsamic vinegars. Generation of consistent flavor levels is extremely difficult. In addition, filtration is often required to produce a clear flavored vinegar and to remove unwanted particulates.

Blending may result in strongly flavored concentrated vinegars. However, at high concentrations, the flavored vinegars may become turbid. If clear, flavored vinegars are desired, it is possible that the end product may be weak in flavor strength and characteristic of the flavor.

FR 2,693,471 discloses the use of cocoa as a flavorant for vinegar. JP 5-153,955 discloses a flavored vinegar which utilizes a spice or spice extract containing isothiocyanate derivatives immersed in vinegar. JP 3-058,766 discloses the preparation of citric flavored vinegar by processing squeezed juice to obtain an essential oil and processing. JP 6-125,179 discloses a flavored vinegar preparation obtained by fermentation.

Thus, there remains a need for flavored vinegars which are clear and stable. It would also be useful if such flavored vinegars could be prepared quickly as needed by a simple method such as the addition of a flavored concentrate to a typical vinegar. Thus, there also remains a need for flavored concentrates which are useful for preparing such flavored vinegars. There also remains a need for methods for preparing such flavored concentrates.

SUMMARY OF THE INVENTION

Accordingly, one object of the present invention is to provide novel flavored vinegars.

It is another object of the present invention to provide novel flavored vinegars which are stable.

It is another object of the present invention to provide novel flavored vinegars which are clear.

It is another object of the present invention to provide novel concentrates which are useful for preparing flavored vinegars.

It is another object of the present invention to provide novel methods for preparing such concentrates.

These and other objects, which will become apparent during the following detailed description, have been achieved by the inventors' discovery that the addition of a flavored oil-in-vinegar microemulsion, which comprises:

(a) 25 to 70% by weight of 50 to 100 grain vinegar;
(b) 5 to 35% by weight of ethanol;
(c) 0.1 to 5% by weight of a flavor material (including extracts, essential oils, lipids, etc.); and
(d) 0.5 to 5% by weight of a surfactant, to a vinegar, produces a clear and palatable flavored vinegar with good storage properties.

The flavored oil-in-vinegar microemulsion may optionally further comprise:

(e) 15 to 25% by weight of a sweetener; and/or
(f) 0.1 to 5% by weight of salt.

DETAILED DESCRIPTION OF THE PREFERRED EMBODIMENTS

Thus, in a first embodiment, the present invention provided flavored oil-in-vinegar microemulsion concentrates, which comprise:

(a) 25 to 70% by weight of 50 to 100 grain vinegar;
(b) 5 to 35% by weight of ethanol;
(c) 0.1 to 5% by weight of a flavor material (including extracts, essential oils, lipids, etc.); and
(d) 0.5 to 5% by weight of a surfactant.

The present flavored oil-in-vinegar microemulsion concentrates may optionally further comprise:

(e) 15 to 25% by weight of a sweetener; and/or
(f) 0.1 to 5% by weight of salt.

Suitably, the ethanol is present in an amount of 5 to 35% by weight, preferably 10 to 33% by weight, more preferably 10 to 30% by weight, based on the total weight of the flavored oil-in-vinegar microemulsion concentrate. Although the ethanol in the flavored oil-in-vinegar microemulsion concentrate may arise from ethanol which is added during the preparation of the flavored oil-in-vinegar microemulsion concentrate, it is also possible that the ethanol present in the flavored oil-in-vinegar microemulsion concentrate will arise from one of the other ingredients used to prepare the flavored oil-in-vinegar microemulsion concentrate. For example, certain flavor extracts contain significant amounts of ethanol. Thus, addition of, e.g., 100 grams of a flavor extract which is 50% by weight ethanol results in the addition of 50 grams of ethanol. When the ethanol is added directly during the preparation of the flavored oil-in-vinegar microemulsion concentrate, it is usually added in the form of a 95% v/v solution of ethanol and water. Thus, addition of, e.g., 100 grams of 95% v/v ethanol results in the addition of about 95 grams of ethanol and about 5 grams of water. When ethanol is added directly to the flavored oil-in-vinegar microemulsion concentrate, it is preferred that it be food grade ethanol.

The flavor material may suitably be basil oil, bay oil, caraway oil, cumin oil, cassia oil, clove oil, dillweed oil, garlic oil, ginger oil, lemon oil, lemon grass oil, lime oil, mustard oil, onion oil, orange oil, rosemary oil, sage oil, thyme oil, spearmint oil, tarragon oil, peppermint oil, and spice oleoresins derived from allspice, basil, capsicum, cinnamon, dill, garlic, black pepper, celery, coriander, ginger, oregano, paprika, rosemary, sage, thyme, and red pepper. Suitable flavor materials also include extracts produced from materials such as lemon, lime, red pepper, garlic, vanilla, almond, and mint; compounded natural and artificial fruit flavors such as raspberry, cherry, grape, blueberry, etc.; fruit juices and fruit juice concentrates derived from banana, pineapple, orange, mango, guava, apple, peach, strawberry, lemon, lime, etc.; and flavor emulsions and combinations of the above-given flavor materials.

Preferred flavor materials include basil oil, garlic oil, ginger oil, lemon oil, lime oil, orange oil, oleoresin paprika, oleoresin red pepper, lemon extract, lime extract, red pepper extract, raspberry flavors, and pineapple juice.

Suitably, the flavor material is present in an amount of 0.1 to 5% by weight, preferably 0.2 to 4.5% by weight, more preferably 0.5 to 4% by weight, based on the total weight of the flavored oil-in-vinegar microemulsion concentrate. As noted above, the flavor material in the flavored oil-in-vinegar microemulsion concentrate may arise from an ingredient which contains other materials such as ethanol and water. For example, certain flavor extracts contain significant amounts of ethanol. Thus, addition of, e.g., 100 grams of a flavor extract which is 75% by weight flavor material and 25% by weight ethanol results in the addition of 75 grams of flavor material and 25 grams of ethanol. Similarly, certain flavor extracts contain significant amounts of water. Thus, addition of, e.g., 100 grams of a flavor extract which is 90% by weight flavor material and 10% by weight water results in the addition of 90 grams of flavor material and 10 grams of water.

The production of stable flavored oil-in-vinegar microemulsion concentrates is dependent upon the selection of specific, functional surfactants. These surfactants are selected from the group of high HLB (hydrophile-lipophile balance) water-dispersible, food grade emulsifiers. The preferred emulsifiers have HLB values in the range of 10 to 20, more preferably 12 to 18. The most preferred surfactants are the polyoxyethylene (20) sorbitan monoesters, known generally as polysorbates. Specific polysorbate emulsifiers which yield the desired flavored oil-in-vinegar microemulsion concentrates include polysorbate 60 (polyoxyethylene (20) sorbitan monostearate), polysorbate 80 (polyoxyethylene (20) sorbitan monooleate), polysorbate 20 (polyoxyethylene (20) sorbitan monolaurate) and mixtures thereof. The preferred polysorbate is polysorbate 60. A brief description of the use of the polysorbates to solubilize flavor oils is given in the product brief "ICI Products for Food-Surfactants," page 15–16, April, 1997, which is incorporated herein by reference.

Other functional surfactants which can be used are the polyglycerol esters. This class of emulsifiers is characterized by a structure in which a fatty acid is esterified with the linked glycerol units of a polyglycerol chain. The polyglycerol esters having the desired solublizing characteristics have HLB values in the range of 10 to 14. These include the mono/dicaprylates, mono/dioleates, mono/dipalmitates, mono/dicaprylates, and mono/distearates of decaglycerol, octaglycerol, and hexaglycerol.

Another surfactant system which has been shown to afford stable flavored oil-in- vinegar microemulsion concentrates is the ethylene oxide-propylene oxide copolymer surfactant. An example of such a surfactant is the food grade copolymer characterized as having an average molecular weight range of 9760 to 13,200 and a cloud point (of a 1 wt. % solution) of 100° C. available from BASF Corp. with the trade name Pluronic F127.

An additional class of surfactants useful for the formation of the present flavored oil-in-vinegar microemulsion concentrates includes the sucrose esters having a HLB value of 12 to 18. Specific examples of such sucrose esters include sucrose monopalmitate, sucrose monostearate, sucrose monolaurate, and sucrose monomyristate.

In addition, other surfactants, such as ethoxylated monoglycerides, mono- and diglyceride esters of citric acid and their sodium salts, mono- and diglycerides of lactic acid dioctyl sodium sulfosuccinate, fatty acids and the sodium and potassium salts of fatty acids may be used.

The preferred surfactants for preparing the present flavored oil-in-vinegar microemulsion concentrates include the polysorbates, polyglycerol esters, sucrose esters, and ethylene oxide-propylene oxide copolymers. These surfactants may be used individually or in selected combinations with each other.

In addition, it is also possible to add a small amount of another type of food emulsifier having a HLB value in the range of 4 to 9 to the primary emulsifiers delineated above to modify the HLB of the primary emulsifier. Agents such as acetylated monoglycerides may also be added as co-solutes to the emulsifiers described above.

Suitably, the surfactant is present in an amount of 0.5 to 5% by weight, preferably 1 to 3% by weight, based on the total weight of the flavored oil-in-vinegar microemulsion concentrate.

The vinegar added during the preparation of the flavored oil-in-vinegar microemulsion concentrate suitably has a grain value of 50 to 100, preferably 50 to 60, more preferably about 50. As is well known to those skilled in the art, the "grain" value of a vinegar is ten times the % (w/v) concentration of the acetic acid in the vinegar. Thus, 50 grain vinegar has an acetic acid concentration of 5.0% (w/v). The remainder of the vinegar is largely water. Suitably, the vinegar is present in an amount of 25 to 70% by weight, preferably 30 to 65% by weight, based on the total weight of the microemulsion. Thus, the present microemulsions contain substantial amounts of water arising from the vinegar.

Aqueous solutions of other food acids may be used in place of part or all of the vinegar. Examples of such acids include citric, lactic, malic, phosphoric, sorbic, adipic, fumaric, maleic, and tartaric. Acidic juices such as lime and lemon juice, and their concentrates, may be employed for part or all of the acid solution. The aqueous solutions of such food acids will include sufficient water to afford an aqueous acid solution having a similar tartness of the vinegar.

Preferably, the vinegar added during the preparation of the flavored oil-in-vinegar microemulsion concentrate is food grade. The vinegar added during the preparation of the flavored oil-in-vinegar microemulsion concentrate may be a white (distilled) vinegar, rice vinegar, cider vinegar, malt vinegar, balsamic vinegar, white wine vinegar, or mixtures thereof.

Red wine vinegars which contain tannins and other polyphenolics are useable but less preferred due to formation of a flocculant or haze upon standing which renders the flavored oil-in-vinegar microemulsion concentrate nonpellucid. The flocculant can be removed by means of an extra processing step such as filtration or centrifugation.

Other less preferred, but useable, artificial vinegars include 4.5 to 10% by weight solutions of acetic acid in water, prepared from concentrated acetic acid solutions (including glacial acetic acid) and water. These vinegars are less preferred due to the lack of natural flavors which are present in the other vinegars described above.

Suitable sweeteners include: corn syrups, e.g., high maltose corn syrup and high fructose corn syrup; sucrose; fructose; corn syrup solids; invert sugars; honey; molasses; glucose; maltose; fruit juice concentrates, e.g., white grape juice concentrate, raspberry juice concentrate, cranberry juice concentrate, pineapple juice concentrate, etc; and full strength fruit juices. Preferred sweeteners include high fructose corn syrup, sucrose, fructose, and honey.

When present, the sweetener is present in an amount of 15 to 25% by weight, preferably 17 to 22% by weight, more preferably 19 to 20% by weight, based on the total weight of the flavored oil-in-vinegar microemulsion concentrate.

It is also possible to add salt to enhance the flavor. When present, the salt is suitably present in an amount of 0.1 to 5% by weight, preferably 1 to 3% by weight, more preferably 1.4 to 2% by weight, based on the total weight of the flavored oil-in-vinegar microemulsion concentrate.

Other optional ingredients include food colorings or dyes; microbial inhibitors such as sodium benzoate or potassium sorbate; and antioxidants such as BHT, vitamin C, and vitamin E.

The present flavored oil-in-vinegar microemulsion concentrates may be prepared according to the following general procedure:

(i) obtaining a flavor material/ethanol mixture;

(ii) mixing the surfactant with the flavor material/ethanol mixture, to obtain a flavor material/ethanol/surfactant mixture; and (iii) mixing the flavor material/ethanol/surfactant mixture with the vinegar.

The process may further comprise:

(i') optionally, heating the surfactant to a temperature of 80 to 140° F., preferably 110 to 120° F., to insure that the surfactant is in the liquid state.

Of course, it is to be understood that step (i) may require the mixing of a flavor material with ethanol. Alternatively, as noted above, many flavor materials are readily available as oils or extracts which already contain ethanol and may be used as is in step (ii).

When a sweetener is present, it is preferred that the sweetener be mixed with the vinegar prior to the addition of the flavor/ethanol/surfactant mixture in step (iii). When salt is present, it is preferred that the salt be mixed with the vinegar prior to the addition of the flavor/ethanol/surfactant mixture in step (iii).

The mixing steps in the present process require no special mixing equipment, as the oil-in-vinegar microemulsions form spontaneously. Likewise, the preparation of the flavored vinegar from the concentrate is a simple dilution process.

The present flavored oil-in-vinegar microemulsion concentrates exist as an oil-in-vinegar microemulsion. Microemulsions are a unique class of polydispersed systems which form spontaneously when a particular balance of interfacial free-energy forces are generated. One type of microemulsion is the oil-in-water microemulsion which exists in the form of spherical micelles of surfactant/oil in a continuous aqueous phase. Alternatively, a water-in-oil microemulsion can form as inverse micelles in which surfactants are concentrated at the interface of a continuous lipid phase which surrounds water droplets. The interfacial free-energies which lead to microemulsion formation are, a priori, balanced, and the microemulsion is considered thermodynamically stable unlike regular emulsions. The dispersed droplets are smaller than the wavelengths of visible light, and the microemulsions are, thus, transparent or translucent in appearance with the dispersed droplets characterized with a size range of 0.5 to 0.15 microns.

Microemulsions are the basis for a number of commercial products such as floor and shoe polishes, personal care products, solubilized vitamins and flavor oils, and tertiary oil recovery systems. However, the formulation and generation of microemulsions remains empirical. The formulator must consider the selection of the class(es), functional character, and relative quantities of the surfactant(s), the presence or addition of co-solvents (usually medium chain alcohols), the type and relative volume of the oil phase, and the relative volume of the aqueous phase. Information on the application of microemulsions in the food industry is limited. The monograph *Microemulsions and Emulsions in Foods,* ACS Symposium Series 448 M. El-Nokaly and D. Cornell, Eds., American Chemical Society, Washington, D.C., pages 7–42, 1991, which is incorporated herein by reference, discusses some specific aspects of food microemulsions. The destabilizing effect of acidic pH values and salts on regular emulsions, as well as microemulsions, are generally known.

The present flavored oil-in-vinegar microemulsion concentrates may be sold as is. The present flavored oil-in-vinegar microemulsion concentrates exhibit good shelf life and may be stored under ambient conditions for periods of time as long as six months, without showing any significant clouding. In the context of the present invention, significant clouding means visible haze, flocculants, or precipitated materials derived from the flavor oils. Preferably, the present flavored oil-in-vinegar microemulsion concentrates are stored in an air-tight container, such as a sealed bottle, jar, pouch, or bag. Surprisingly, no ethyl acetate from the esterification of acetic acid with ethanol was detected organoleptically, in the oil-in-vinegar microemulsions, even after six months storage under ambient conditions.

The present flavored oil-in-vinegar microemulsion concentrates may be diluted to form a flavored vinegar. The present flavored oil-in-vinegar microemulsion concentrates are suitably diluted with a vinegar having a grain value in the range of 45 to 100, preferably 50 to 70, more preferably about 50. Types of vinegars which may be employed for the dilution include: white (distilled) vinegars, rice vinegars, cider vinegars, malt vinegars, balsamic vinegars, tarragon vinegar, and white wine vinegars.

Red wine vinegars which contain tannins and other polyphenolics are useable but less preferred diluents due to formation of a flocculent or haze upon standing which renders the final product non-pellucid. The flocculant can be removed by means of an extra processing step such as filtration or centrifugation.

Acidic juices such as lime and lemon juice, and their concentrates, may be employed for part or all of the acid solution. Other less preferred, but useable, diluents include 4.5 to 10% by weight solutions of acetic acid in water, prepared from acetic acid (preferably glacial acetic acid) and water. These diluents are less preferred due to the lack of natural flavors which are present in the vinegars described above.

Typically, the present flavored oil-in-vinegar microemulsion concentrates are diluted with the vinegar in an amount such that the final, flavored vinegar comprises 1 to 6% by weight, preferably 2 to 5% by weight, more preferably about 3% by weight, based on the total weight of the final, flavored vinegar, of the flavored oil-in-vinegar microemulsion concentrate, and 94 to 99% by weight, preferably 95 to 98% by weight, more preferably about 97% by weight, based on the total weight of the final, flavored vinegar, of the vinegar used for dilution.

The dilution of the flavored oil-in-vinegar microemulsion concentrate with the vinegar to form the flavored vinegar may be carried out by simply mixing the flavored oil-in-vinegar microemulsion concentrate with the vinegar in the appropriate amounts. Although the order of addition is not critical, for convenience, it is preferred to add the flavored oil-in-vinegar microemulsion concentrate to the vinegar.

As in the case of the flavored oil-in-vinegar microemulsion concentrates, the present flavored vinegars are preferably stored in an air-tight container, such as a sealed bottle, jar, pouch, or bag.

The final flavored vinegars are obtained as transparent, colored liquids. In some cases a translucent character is noted.

Thus, the present invention provides sparkling clear, stable, flavorful vinegars in the form of a microemulsion with the clarity and flavor impact associated with typical vinegar, and which are difficult to obtain without infusion and filtration systems. The present flavored oil-in-vinegar microemulsion concentrates offer the advantage of being able to afford essentially instant flavored vinegars by simply diluting the flavored oil-in-vinegar microemulsion concentrate with typical vinegar.

Other features of the invention will become apparent in the course of the following descriptions of exemplary embodiments which are given for illustration of the invention and are not intended to be limiting thereof.

EXAMPLES

In the following Examples, all amounts are given in % by weight, based on the total weight of the flavored oil-in-vinegar microemulsion concentrate, unless otherwise specified.

Example 1

A ginger-cilantro flavored vinegar was prepared from the ingredients shown below by the process described below:

| Ingredient: | wt. % | Grams |
| --- | --- | --- |
| Ginger flavors: | | |
| (a) Ginger cilantro flavor #046-0032[1] | 23.18 | 46.35 |
| (b) Ginger cilantro flavor #046-0031[2] | 23.18 | 46.35 |
| Other ingredients: | | |
| Caramel Color 1X Liquid | 0.69 | 1.38 |
| Polycon T60K (Polysorbate 60)[3] | 2.56 | 5.12 |
| Salt HG. Blending | 1.65 | 3.30 |
| Granulated Sugar | 19.04 | 38.08 |
| White Vinegar, 50 grain | 29.70 | 59.41 |
| Total | 100.00 | 200.00 |

[1] Ginger cilantro flavor #046-0032 is available from Alex Fries Inc., Cincinnati, Ohio, and contains 40–50 wt. % ethanol and 40–50 wt. % water.
[2] Ginger cilantro flavor #046-0031 is available from Alex Fries Inc., Cincinnati, Ohio, and contains 40–50 wt. % ethanol and 40–50 wt. % water.
[3] Witco Corporation.

The ethanol contributed from the ginger flavors (a) and (b) amounts to 23wt. % (46 g).

The ginger flavors were combined in a mixing vessel and mixed for five minutes on a stir plate. The polysorbate 60 was heated to 120° F. and then added to the ginger flavors. The resulting mixture was stirred for five minutes. In a separate mixing vessel, the vinegar, sugar, salt, and colors were combined and stirred on a stir plate until a transparent solution was achieved. The ginger-flavor/polysorbate 60 mixture was then added to the vinegar/sugar/salt/colors mixture prepared above, and the resulting mixture was stirred for five minutes to afford a ginger-cilantro flavored oil-in-vinegar microemulsion concentrate.

The ginger-cilantro flavored oil-in-vinegar microemulsion concentrate so prepared exhibited a transparent, deep amber color and low viscosity.

The ginger-cilantro flavored oil-in-vinegar microemulsion concentrate so prepared was then diluted in 50 grain vinegar to a range of 2 to 6 wt. % microemulsion concentrate and a range of 94 to 98 wt. % vinegar, to afford a ginger-cilantro flavored vinegar which was a transparent, light yellow colored liquid.

Example 2

A citrus flavored vinegar was prepared from the ingredients shown below by the process described below:

| Ingredient: | wt. % | Grams |
| --- | --- | --- |
| Citrus flavors: | | |
| (a) Lime Extract 3AA850[1] | 16.08 | 32.17 |
| (b) Mandarin Orange Flavor 3AA463[2] | 22.93 | 45.87 |
| (c) Lemon extract 3AEl89[3] | 6.88 | 13.76 |
| Other ingredients: | | |
| Polycon T6OK (Polysorbate 60)[4] | 1.08 | 2.17 |
| Salt HG blending | 1.82 | 3.64 |
| Granulated Sugar | 20.04 | 40.07 |
| White Vinegar, 50 grain | 30.95 | 61.89 |
| Yellow color[5] | 0.22 | 0.43 |
| Total | 100.00 | 200.00 |

[1] Lime Extract 3AA850 manufactured by McCormick & Co., Sparks, MD, and contains 60–70 wt. % ethanol and 30–40 wt. % water.
[2] Mandarin Orange Flavor 3AA463 manufactured by McCormick & Co., Sparks, MD, and contains 60–70 wt. % ethanol and 30–40 wt. % water.
[3] Lemon extract 3AE189 manufactured by McCormick & Co., Sparks, MD, and contains 60–70 wt. % ethanol and 30–40 wt. % water.
[4] Witco Corporation.
[5] Yellow color manufactured by McCormick & Co., Sparks, MD.

The ethanol contributed from (a), (b), and (c) amounted to 27.5 wt. % (55 g).

The citrus flavors were combined in a mixing vessel and mixed for five minutes on a stir plate. The polysorbate 60 was heated to 120° F. and then added to the citrus flavors. The resulting mixture was stirred for five minutes. In a separate mixing vessel, the vinegar, sugar, salt, and colors were combined and stirred on a stir plate until a transparent solution was achieved. The citrus-flavor/polysorbate 60 mixture was then added to the vinegar/sugar/salt/colors mixture prepared above, and the resulting mixture was stirred for five minutes.

The citrus flavored oil-in-vinegar microemulsion so prepared was a transparent, deep yellow colored liquid. The citrus flavored oil-in-vinegar microemulsion so prepared was then diluted in 50 grain vinegar to a range of 2 to 6 wt. % microemulsion concentrate and a range of 94 to 98 wt. % vinegar, to afford a citrus flavored vinegar which was a transparent, light yellow colored liquid.

Example 3

A garlic flavored vinegar was prepared from the ingredients shown below by the process described below:

| Ingredient: | Wt. % | Grams |
| --- | --- | --- |
| Oil of garlic | 0.29 | 0.58 |
| Ethanol 95% (V/V) | 10.00 | 20.00 |
| Polycon T60K (Polysorbate 60)[1] | 1.75 | 3.51 |
| Vinegar, 50 grain | 65.95 | 131.90 |
| Granulated Sugar | 20.00 | 40.01 |
| Salt HG. Blending | 2.00 | 4.00 |
| Total | 100.00 | 200.00 |

[1] Witco Corporation.

The garlic oil and ethanol were combined in a mixing vessel and mixed for five minutes on a stir plate. The polysorbate 60 was heated to 120° F. and then added to the garlic-oil/ethanol mixture. The resulting mixture was stirred for five minutes. In a separate mixing vessel, the vinegar, sugar, and salt were combined and stirred on a stir plate until a transparent solution was achieved. The garlic-oil/ethanol/polysorbate 60 mixture was then added to the vinegar/sugar/salt/mixture prepared above, and the resulting mixture was stirred for five minutes.

The garlic flavored oil-in-vinegar microemulsion so prepared was a transparent, off-white colored liquid. The garlic flavored oil-in-vinegar microemulsion so prepared was then diluted in 50 grain vinegar to a range of 2 to 6 wt. % microemulsion concentrate and a range of 94 to 98 wt. % vinegar, to afford a garlic flavored vinegar which was a transparent, liquid.

Example 4

A chili-cilantro flavored vinegar was prepared from the ingredients shown below by the process described below:

| Ingredient: | Wt. % | Grams |
| --- | --- | --- |
| Chili-cilantro Flavors: | | |
| (a) Capsicum Extract F51603[1] | 0.88 | 1.76 |
| (b) Oil of Cilantro[2] | 0.38 | 0.76 |
| Other Ingredients: | | |
| Ethanol 95% (V/V) | 10.00 | 20.00 |
| Polycon T60K (Polysorbate 60)[3] | 2.93 | 5.86 |
| Red Color Liquid[4] | 0.06 | 0.12 |
| Yellow Color Liquid[5] | 0.18 | 0.35 |
| Caramel color liquid 1X | 0.26 | 0.53 |
| White vinegar, 50 grain | 63.31 | 126.62 |
| Granulated Sugar | 20.00 | 40.00 |
| Salt H.G. blending | 2.00 | 4.00 |
| Total | 100.00 | 200.00 |

[1] Capsicum Extract F51603 manufactured by McCormick & Co., Sparks, MD, and contains 40–50 wt. % ethanol and 30–40 wt. % water.
[2] Oil of Cilantro supplied by McCormick & Co., Sparks, MD.
[3] Witco Corporation.
[4] Red Color Liquid manufactured by McCormick & Co., Sparks, MD.
[5] Yellow Color Liquid manufactured by McCormick & Co., Sparks, MD.

The capsicum extract, oil of cilantro, and ethanol were combined in a mixing vessel and mixed for five minutes on a stir plate. The polysorbate 60 was heated to 120° F. and then added to the capsicum-extract/oil-of-cilantro/ethanol mixture. The resulting mixture was stirred for five minutes. In a separate mixing vessel, the vinegar, sugar, salt, and colors were combined and stirred on a stir plate until a transparent solution was achieved. The capsicum-extract/oil-of-cilantro/ethanol/polysorbate 60 mixture was then added to the vinegar/sugar/salt/colors mixture prepared above, and the resulting mixture was stirred for five minutes.

The chili-cilantro flavored oil-in-vinegar microemulsion so prepared was a transparent, deep red-amber colored liquid. The chili-cilantro flavored oil-in-vinegar microemulsion so prepared was then diluted in 50 grain vinegar to a range of 2 to 6 wt. % microemulsion concentrate and a range of 94 to 98 wt. % vinegar, to afford a chili-cilantro flavored vinegar which was a transparent, light red-amber colored liquid.

Obviously, numerous modifications and variations of the present invention are possible in light of the above teachings. It is therefore to be understood that within the scope of the appended claims, the invention may be practiced otherwise than as specifically described herein.

We claim:

1. A composition, comprising:
   (a) 25 to 70% by weight of 50 to 100 grain vinegar;
   (b) 5 to 35% by weight of ethanol;
   (c) 0.1 to 5% by weight of a-flavor material; and
   (d) 0.5 to 5% by weight of a surfactant.

2. The composition of claim 1, wherein said flavor material is selected from the group consisting of basil oil; bay oil; caraway oil; cumin oil; cassia oil; clove oil; dillweed oil; garlic oil; ginger oil; lemon oil; lemon grass oil; lime oil; mustard oil; onion oil; orange oil; rosemary oil; sage oil; thyme oil; spearmint oil; tarragon oil; peppermint oil; spice oleoresins derived from allspice, basil, capsicum, cinnamon, dill, garlic, black pepper, celery, coriander, ginger, oregano, paprika, rosemary, sage, thyme, and red pepper; extracts produced from lemon, lime, red pepper, garlic, vanilla, almond, and mint; compounded natural flavors of raspberry, cherry, grape, and blueberry; compounded artificial fruit flavors of raspberry, cherry, grape, and blueberry; fruit juices derived from banana, pineapple, orange, mango, guava, apple, peach, strawberry, lemon, and lime; fruit juice concentrates derived from banana, pineapple, orange, mango, guava, apple, peach, strawberry, lemon, and lime; and flavor emulsions and combinations thereof.

3. The composition of claim 1, wherein said surfactant is selected from the group consisting of polysorbates, polyglycerol esters, sucrose esters, and ethylene oxide-propylene oxide copolymers.

4. The composition of claim 1, further comprising:
   (e) 15 to 25% by weight of a sweetener.

5. The composition of claim 4, wherein said sweetener is selected from the group consisting of corn syrups, sucrose, fructose, corn syrup solids, invert sugars, honey, molasses, glucose, maltose, fruit juice concentrates, full strength fruit juices, and fruit juice powders.

6. The composition of claim 1, further comprising:
   (f) 0.1 to 5% by weight of salt.

7. A method for preparing a composition comprising:
   (a) 25 to 70% by weight of 50 to 100 grain vinegar;
   (b) 5 to 35% by weight of ethanol;
   (c) 0.1 to 5% by weight of a flavor material; and
   (d) 0.5 to 5% by weight of a surfactant,
said method comprising:
   (i) obtaining a flavor material/ethanol mixture;
   (ii) mixing said surfactant with said flavor material/ethanol mixture, to obtain a flavor material/ethanol/surfactant mixture; and
   (iii) mixing said flavor material/ethanol/surfactant mixture with said vinegar.

8. The method of claim 7, wherein said flavor material is selected from the group consisting of basil oil; bay oil; caraway oil; cumin oil; cassia oil; clove oil; dillweed oil; garlic oil; ginger oil; lemon oil; lemon grass oil; lime oil; mustard oil; onion oil; orange oil; rosemary oil; sage oil; thyme oil; spearmint oil; tarragon oil; peppermint oil; spice oleoresins derived from allspice, basil, capsicum, cinnamon, dill, garlic, black pepper, celery, coriander, ginger, oregano, paprika, rosemary, sage, thyme, and red pepper; extracts produced from lemon, lime, red pepper, garlic, vanilla, almond, and mint; compounded natural flavors of raspberry, cherry, grape, and blueberry; compounded artificial fruit flavors of raspberry, cherry, grape, and blueberry; fruit juices derived from banana, pineapple, orange, mango, guava, apple, peach, strawberry, lemon, and lime; fruit juice concentrates derived from banana, pineapple, orange, mango, guava, apple, peach, strawberry, lemon, and lime; and flavor emulsions and combinations thereof.

9. The method of claim 7, wherein said surfactant is selected from the group consisting of polysorbates, polyglycerol esters, sucrose esters, and ethylene oxide-propylene oxide copolymers.

10. The method of claim 7, wherein said composition further comprises:

(e) 15 to 25% by weight of a sweetener, and said method comprises:

(i) obtaining a flavor material/ethanol mixture;

(ii) mixing said surfactant with said flavor material/ethanol mixture, to obtain a flavor material/ethanol/surfactant mixture;

(iii) mixing said vinegar with said sweetener, to obtain a vinegar/sweetener mixture; and (iv) mixing said flavor material/ethanol/surfactant mixture with said vinegar/sweetener mixture.

11. The method of claim 10, wherein said sweetener is selected from the group consisting of corn syrups, sucrose, fructose, corn syrup solids, invert sugars, honey, molasses, glucose, maltose, fruit juice concentrates, full strength fruit juices, and fruit juice powders.

12. The method of claim 7, wherein said composition further comprises:

(e) 0.1 to 5% by weight of salt, and said method comprises:

(i) obtaining a flavor material/ethanol mixture;

(ii) mixing said surfactant with said flavor material/ethanol mixture, to obtain a flavor material/ethanol/surfactant mixture;

(iii) mixing said vinegar with said salt, to obtain a vinegar/salt mixture; and (iv) mixing said flavor material/ethanol/surfactant mixture with said vinegar/salt mixture.

13. A flavored vinegar prepared by mixing:

(A) vinegar; and (B) a composition, which comprises:

(a) 25 to 70% by weight of 50 to 100 grain vinegar;

(b) 5 to 35% by weight of ethanol;

(c) 0.1 to 5% by weight of a flavor material; and (d) 0.5 to 5% by weight of a surfactant.

14. The flavored vinegar of claim 13, wherein said flavor material is selected from the group consisting of basil oil; bay oil; caraway oil; cumin oil; cassia oil; clove oil; dillweed oil; garlic oil; ginger oil; lemon oil; lemon grass oil; lime oil; mustard oil; onion oil; orange oil; rosemary oil; sage oil; thyme oil; spearmint oil; tarragon oil; peppermint oil; spice oleoresins derived from allspice, basil, capsicum, cinnamon, dill, garlic, black pepper, celery, coriander, ginger, oregano, paprika, rosemary, sage, thyme, and red pepper; extracts produced from lemon, lime, red pepper, garlic, vanilla, almond, and mint; compounded natural flavors of raspberry, cherry, grape, and blueberry; compounded artificial fruit flavors of raspberry, cherry, grape, and blueberry; fruit juices derived from banana, pineapple, orange, mango, guava, apple, peach, strawberry, lemon, and lime; fruit juice concentrates derived from banana, pineapple, orange, mango, guava, apple, peach, strawberry, lemon, and lime; and flavor emulsions and combinations thereof.

15. The flavored vinegar of claim 13, wherein said surfactant is selected from the group consisting of polysorbates, polyglycerol esters, sucrose esters, and ethylene oxide-propylene oxide copolymers.

16. The flavored vinegar of claim 13, wherein said composition further comprises:

(e) 15 to 25% by weight of a sweetener.

17. The flavored vinegar of claim 16, wherein said sweetener is selected from the group consisting of corn syrups, sucrose, fructose, corn syrup solids, invert sugars, honey, molasses, glucose, maltose, fruit juice concentrates, full strength fruit juices, and fruit juice powders.

18. The flavored vinegar of claim 13, wherein said composition further comprises:

(f) 0.1 to 5% by weight of salt.

19. The flavored vinegar of claim 13, wherein said composition comprises:

(A) 94 to 99% by weight of said vinegar; and (B) 1 to 6% by weight of said composition.

20. The flavored vinegar of claim 13, wherein said composition comprises:

(A) 95 to 98% by weight of said vinegar; and (B) 2 to 5% by weight of said composition.

* * * * *